United States Patent
Liu (10) Patent No.: US 11,979,307 B2
(45) Date of Patent: May 7, 2024

(54) NETWORK SWITCHING METHOD AND APPARATUS, ELECTRONIC DEVICE, AND STORAGE MEDIUM

(71) Applicant: INSPUR SUZHOU INTELLIGENT TECHNOLOGY CO., LTD., Jiangsu (CN)

(72) Inventor: Yuanfeng Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/280,259

(22) PCT Filed: Feb. 28, 2022

(86) PCT No.: PCT/CN2022/078280
§ 371 (c)(1),
(2) Date: Sep. 4, 2023

(87) PCT Pub. No.: WO2023/000672
PCT Pub. Date: Jan. 26, 2023

(65) Prior Publication Data
US 2024/0039825 A1 Feb. 1, 2024

(30) Foreign Application Priority Data

Jul. 23, 2021 (CN) .......................... 202110838063.4

(51) Int. Cl.
*G06F 15/173* (2006.01)
*H04L 41/0816* (2022.01)
(Continued)

(52) U.S. Cl.
CPC .......... *H04L 43/20* (2022.05); *H04L 41/0816* (2013.01); *H04L 41/40* (2022.05)

(58) Field of Classification Search
CPC ...... H04L 43/20; H04L 41/0816; H04L 41/40
See application file for complete search history.

(56) References Cited

U.S. PATENT DOCUMENTS

| 2017/0052807 A1* | 2/2017 | Kristiansson | ............. G06F 8/60 |
| 2017/0126552 A1* | 5/2017 | Pfaff | ....................... H04L 45/56 |

(Continued)

FOREIGN PATENT DOCUMENTS

| CN | 111585917 A | 8/2020 |
| CN | 111901177 A | 11/2020 |

(Continued)

OTHER PUBLICATIONS

Jinxian Guo. "Bare Metal Distributed PXE Service for Cloud Tube Platform." China Computer and Communication. Issue 9, 2019. May 15, 2019.

(Continued)

*Primary Examiner* — Padma Mundur
(74) *Attorney, Agent, or Firm* — IPro, PLLC (57) ABSTRACT

The present disclosure discloses a network switching method and apparatus, an electronic device, and a computer-read-able storage medium, the method including: creating a smart monitor used for monitoring port changes; if the smart monitor monitors that a smart port for deploying a network is created, performing network deployment of a bare metal server (bms) node by using the smart port, wherein a smart network interface card is installed in the bms node, and the smart network interface card generates a first bare metal port at the bms node and generates a second bare metal port corresponding to the first bare metal port in an operating system of the smart network interface card; if the smart monitor monitors that a neutron port of a neutron network is updated, adding the second bare metal port into a network bridge of the bms node.

20 Claims, 3 Drawing Sheets

(51) Int. Cl.
  *H04L 41/40* (2022.01)
  *H04L 43/20* (2022.01)

(56) References Cited

U.S. PATENT DOCUMENTS

2018/0124163 A1   5/2018  Abali et al.
2018/0139098 A1*  5/2018  Sunavala ............... H04L 45/00

FOREIGN PATENT DOCUMENTS

| CN | 112367186 A | 2/2021 |
| CN | 112436966 A | 3/2021 |
| CN | 112671578 A | 4/2021 |
| CN | 113708954 A | 11/2021 |
| WO | 2017152633 A1 | 9/2017 |

OTHER PUBLICATIONS

Open vSwitch Manual by Linux Foundation Open vSwitch Collaborative Project, retrieved from http://www.openvswitch.org/support/dist-docs/ovs-ofctl.8.pdf. Published on Oct. 21, 2021.

* cited by examiner

NETWORK SWITCHING METHOD AND APPARATUS, ELECTRONIC DEVICE, AND STORAGE MEDIUM

CROSS-REFERENCE TO RELATED APPLICATION

This application claims the priority of the Chinese Patent application filed on Jul. 23, 2021 before the China National Intellectual Property Administration with the application number of 202110838063.4, and the title of "NETWORK SWITCHING METHOD AND APPARATUS, ELECTRONIC DEVICE, AND STORAGE MEDIUM", which is incorporated herein in its entirety by reference.

FIELD

The present disclosure relates to the technical field of computers and, more particularly, to a network switching method and apparatus, an electronic device and a computer-readable storage medium.

BACKGROUND

With the rapid development of the field of cloud computing, bare metal services are a kind of computing services that combines the flexibility of a virtual machine and the performance of a physical machine, and may provide exclusive cloud physical servers for individuals or enterprises. The bare metal servers may provide excellent computing performance and ensure data security for key application systems, high-performance computation, big data, core databases, and other services. Creating a bare metal cloud physical machine may be just like creating a virtual machine. A required bare metal cloud physical machine may be created by merely specifying required hardware requirements (for example: a cpu memory), mirroring, and a required network. Furthermore, users may flexibly apply and apply for using this machine on demand.

However, an implementation scheme of OVERLAY (Overlay is a virtual network created on an existing physical network) of a bare metal is different from a scheme of an OVERLAY of virtual machines on openstack. For the virtual machines on the openstack, they share and occupy resources of the computing nodes, but the computing nodes would not be exposed to end users. Therefore, tunnels may be deployed on the computing nodes to achieve encapsulation and de-encapsulation of the OVERLAY of the virtual machines. However, in a bare metal scenario, the bare metal occupies one computing node alone. This computing node needs to be fully exposed to the final users. Therefore, the virtual machine OVERLAY implementation of deploying a tunnel on the computing node cannot be applied in the bare metal scenario. For the OVERLAY of the bare metal, the encapsulation and the de-encapsulation of bare metal incoming and outgoing messages may be achieved in an operating system of a smart network interface card with the help of the smart network interface card.

SUMMARY

An object of the present disclosure is to provide a network switching method and apparatus, an electronic device and a computer-readable storage medium. Configuration of a deployed network and switching from the deployed network to a neutron network are achieved in a scheme of achieving OVERLAY of a bare metal with the help of a smart network interface card.

In order to achieve the object stated above, the present disclosure provides a network switching method, including:
creating a smart monitor configured to monitor port changes;
in a case that the smart monitor monitors that a smart port of a deployed network is created, performing network deployment of a bare metal server node by using the smart port, wherein a smart network interface card is installed on the bare metal server node, and the smart network interface card generates a first bare metal port at the bare metal server node and generates a second bare metal port corresponding to the first bare metal port in an operating system of the smart network interface card;
in a case that the smart monitor monitors that a neutron port of a neutron network is updated, adding the second bare metal port into a network bridge of the bare metal server node, and binding the second bare metal port in the network bridge to the neutron port; and
issuing a flow table of the neutron network to perform switching from the deployed network of a bare metal service to the neutron network.

Wherein performing the network deployment of the bare metal server node by using the smart port includes:
adding the second bare metal port into the network bridge of the bare metal server node, and binding the second bare metal port in the network bridge to the smart port;
issuing a flow table of the deployed network to perform the network deployment of the bare metal service; and
after the network deployment is completed, deleting the smart port, and deleting the second bare metal port from the network bridge of the bare metal server node.

Wherein after the smart port of the deployed network is created, the method further includes:
synchronizing port information of the smart port and a binding attribute of the smart port to a port-binding table; and
correspondingly, after the neutron port of the neutron network is updated, the method further includes:
synchronizing port information of the neutron port and a binding attribute of the neutron port to the port-binding table.

Wherein synchronizing the port information of the smart port and the binding attribute of the smart port to the port-binding table includes:
synchronizing the port information of the smart port and the binding attribute of the smart port to a port-binding table of a southbound database of an open virtual network through a northbound database of the open virtual network; and
correspondingly, synchronizing the port information of the neutron port and the binding attribute of the neutron port to the port-binding table includes:
synchronizing the port information of the neutron port and the binding attribute of the neutron port to the port-binding table of the southbound database of the open virtual network through the northbound database of the open virtual network.

Wherein the smart monitor is configured to monitor changes of the port-binding table;
when the smart monitor monitors that the smart port is newly added in the port-binding table, the step of adding the second bare metal port into the network bridge of the bare metal server node, and binding the second bare metal port in the network bridge to the smart port is executed;

when the smart monitor monitors that the smart port in the port-binding table is deleted, the step of deleting the second bare metal port from the network bridge of the bare metal server node is executed; and when the smart monitor monitors that the neutron port is newly added in the port-binding table, the step of adding the second bare metal port into the network bridge of the bare metal server node, and binding the second bare metal port in the network bridge to the neutron port is executed.

Wherein before adding the second bare metal port into the network bridge of the bare metal server node, the method further includes:

obtaining a hostname in a creating instruction of the smart port, and determining whether the hostname in the creating instruction is consistent with a hostname of the bare metal server node; and in a case that the hostname in the creating instruction is consistent with the hostname of the bare metal server node, executing the step of adding the second bare metal port into the network bridge of the bare metal server node.

Wherein after the network deployment is completed, deleting the smart port includes:

in a case that it is detected that a user mirror image is copied into a hard disk of the bare metal server node, determining that the network deployment is completed, and deleting the smart port.

Wherein before creating the smart monitor configured to monitor the port changes, the method further includes:

deploying Openstack on a deployment node, and installing a smart network interface card at the bare metal server node; and configuring internet protocol (IP) addresses for the deployment node and the bare metal server node, respectively, to achieve communication between the deployment node and the bare metal server node.

In order to achieve the object stated above, the present disclosure provides a network switching apparatus, including:

a creating module, configured to create a smart monitor configured to monitor port changes;

a deployment module, configured to: when the smart monitor monitors that a smart port of a deployed network is created, perform network deployment of a bare metal server node by using the smart port, wherein a smart network interface card is installed on the bare metal server node, and the smart network interface card generates a first bare metal port at the bare metal server node and generates a second bare metal port corresponding to the first bare metal port in an operating system of the smart network interface card;

a binding module, configured to: when the smart monitor monitors that a neutron port of a neutron network is updated, add the second bare metal port into a network bridge of the bare metal server node, and bind the second bare metal port in the network bridge to the neutron port; and a switching module, configured to issue a flow table of the neutron network to perform switching from the deployed network of a bare metal service to the neutron network.

In order to achieve the object stated above, the present disclosure provides an electronic device, including:

a memory, configured to store a computer program; and
a processor, configured to implement, when the processor executes the computer program, the steps of the network switching method stated above.

In order to achieve the object stated above, the present disclosure provides a computer-readable storage medium, wherein the computer-readable storage medium stores a computer program; and when the computer program is executed by a processor, the steps of the network switching method stated above are implemented.

According to the above solutions, a network switching method provided by the present disclosure includes: creating a smart monitor configured to monitor port changes; in a case that the smart monitor monitors that a smart port of a deployed network is created, performing network deployment of a bare metal server node by using the smart port, wherein a smart network interface card is installed on the bare metal server node, and the smart network interface card generates a first bare metal port at the bare metal server node and generates a second bare metal port corresponding to the first bare metal port in an operating system of the smart network interface card; in a case that the smart monitor monitors that a neutron port of a neutron network is updated, adding the second bare metal port into a network bridge of the bare metal server node, and binding the second bare metal port in the network bridge to the neutron port; and issuing a flow table of the neutron network, to perform switching from the deployed network of a bare metal service to the neutron network.

According to the present disclosure, the smart monitor monitors the port changes, and the smart port of the deployed network is used, so that configurations of the deployed network are achieved. In addition, in the present disclosure, by creating the neutron port of the neutron network, adding the second bare metal port into the network bridge of the bare metal server node, and binding the second bare metal port with the neutron port, the switching from the deployed network to the neutron network is achieved. Therefore, in the present disclosure, by controlling the adding and deletion of the second bare metal port on the smart network interface card into and from the network bridge of the bare metal server node, and controlling the issuing of the flow table of the deployed network and the flow table of the neutron network, thus the switching between the neutron network and the deployed network is controlled. The present disclosure further discloses a network switching apparatus, an electronic device, and a computer-readable storage medium, which may also achieve the above technical effects.

It should be understood that the above general description and the following detailed description are exemplary only, and are not intended to limit the present disclosure.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other drawings according to these drawings without involving any inventive effort. The drawing is intended to provide a further understanding of the present disclosure and form a part of the specification, together with the embodiments below, to explain the present disclosure, but does not constitute a restriction on the present disclosure. In the drawings.

DETAILED DESCRIPTION

In order to make the objects, the technical solutions and the advantages of the embodiments of the present disclosure clearer, the technical solutions according to the embodiments of the present disclosure may be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure. In addition, in the embodiment of the present disclosure, "first", "second", etc., are used to distinguish similar objects and are not necessarily used to describe a particular order or precedence.

Embodiments of the present disclosure disclose a network switching method. Configuration of a deployed network and switching from the deployed network to a neutron network are achieved in a scheme of achieving OVERLAY of a bare metal with the help of a smart network interface card.

Figure 1:
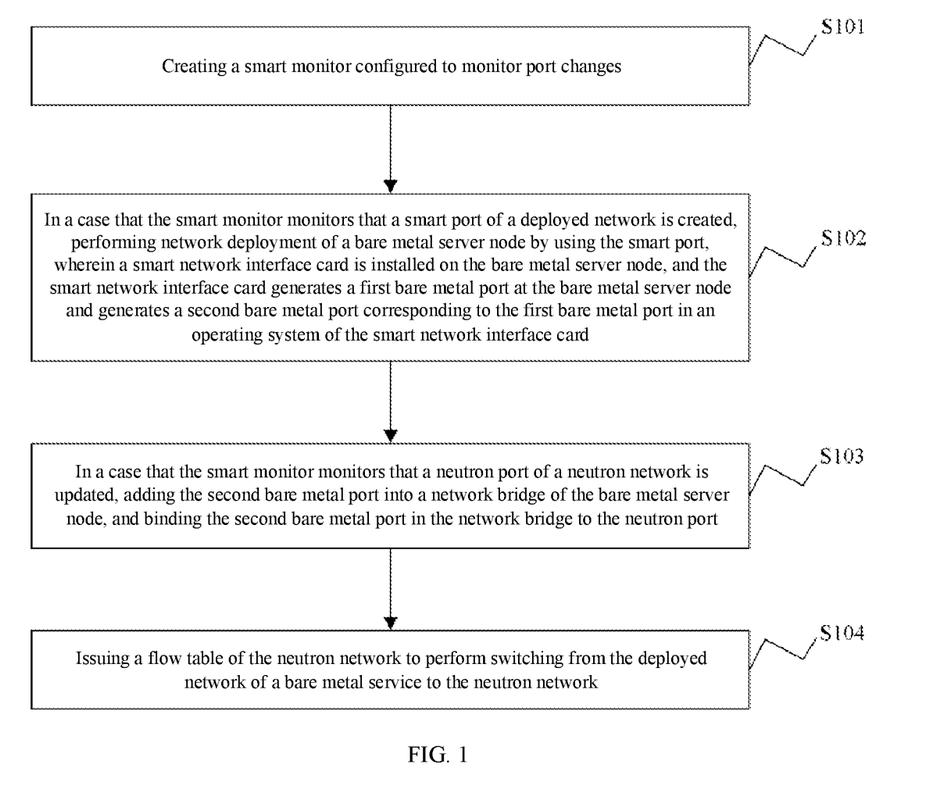
FIG. 1 is a flowchart of a network switching method shown according to an exemplary embodiment.

Referring to FIG. 1, which is a flowchart of a network switching method shown according to an exemplary embodiment. As shown in FIG. 1, the network switching method includes:

S101: creating a smart monitor configured to monitor port changes.

In this embodiment, the smart monitor is created to monitor the port changes. For example, creating a smart port of a deployed network, deleting the smart port, and creating a neutron port of a neutron network may be monitored by the smart monitor.

S102: in a case that the smart monitor monitors that a smart port of a deployed network is created, performing network deployment of a bare metal server node by using the smart port, wherein a smart network interface card is installed on the bare metal server node, and the smart network interface card generates a first bare metal port at the bare metal server node and generates a second bare metal port corresponding to the first bare metal port in an operating system of the smart network interface card.

This step aims at deploying the network. The deployed network is a concept in ironic. By means of the deployed network, the bare metal may obtain a memory file system of a deployment mirror image. After the obtained memory file system is powered on, a user mirror image may be copied to a bare metal system.

Figure 2:
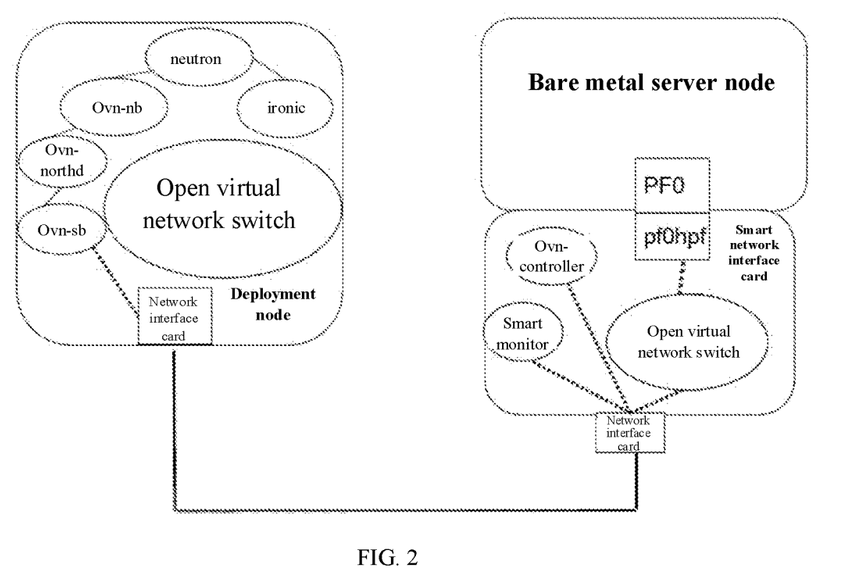
FIG. 2 is a hardware architecture diagram of a network switching method shown according to an exemplary embodiment.

As a feasible implementation, before creating the smart monitor configured to monitor the port changes, the method further includes: deploying Openstack on a deployment node, and installing a smart network interface card at the bare metal server node; and configuring internet protocol (IP) addresses for the deployment node and the bare metal server node, respectively, to achieve communication between the deployment node and the bare metal server node. A hardware architecture diagram applied in the present embodiment is as shown in FIG. 2. A deployment node is as shown on the left, and a bare metal node is as shown on the right. The bare metal node includes a bare metal and a smart network interface card, and the smart network interface card includes an advanced RISC machines (ARM) operating system. In an implementation, Openstack is deployed at the deployment node. Openstack is a cloud computing open source infrastructure project, and a neutron ironic nova component are included in the Openstack. At the same time, an open virtual network (OVN) and an open virtual switch (OVS) are installed and deployed. The smart network interface card is installed at the bare metal node, and a bare metal server (BareMetal) is generally configured to indicate a physical server that is not yet installed with an operating system. An operating system is installed in the smart network interface card, and an ovn-controller and an OVS are installed on the operating system. The smart network interface card in the present embodiment adopts a bluefield2 smart network interface card introduced by Mellanox. After the smart network interface card is plugged into the bare metal server node, the smart network interface card may generate the first bare metal port (PF0) at the bare metal server node. Similarly, in an arm operating system of the smart network interface card, there may also be a port, namely, the second bare metal port (pf0hpf), corresponding to the PF0 in the bare metal system.

It should be noted that a bare machine may be registered by making the capacities of a cpu, an internal memory, and a hard disk of the bare machine, to save a universally unique identifier (uuid) of a bare machine. An openstack application programming interface (API) is invoked to create a bare metal management service (ironic) port.

Codes may be as follows: openstack bare metal port create mac--node uuid--local-link-connection hostname=arm01--local-link-connection port_id="pf0hpf"--pxe-enabled true--is-smartnic, wherein media access control (mac) is a mac of the PF0 of the smart network interface card; uuid is a bare machine uuid generated after the registration is completed; arm01 is a hos tname of the arm smart network interface card; and pf0hpf is the port corresponding to the PF0 in the arm operating system.

As a feasible implementation, performing the network deployment of the bare metal server node by using the smart port includes: adding the second bare metal port into the network bridge of the bare metal server node, and binding the second bare metal port in the network bridge to the smart port; issuing a flow table of the deployed network, to perform the network deployment of the bare metal service; and after the network deployment is completed, deleting the smart port, and deleting the second bare metal port from the network bridge of the bare metal server node. In an implementation, a cloud physical machine is created on the bare machine through the nova api, and the ironic may invoke an API of neutron (which is a network component of the Openstack cloud computing open source project) to create the smart port of the deployed network, with a following binding attribute {'requested-chassis':'arm01','smart_port': 'pf0hpf','vnic_type':'smart-nic'}.

As an implementation, after creating the smart port of the deployed network, the method further includes: synchronizing port information of the smart port and a binding attribute of the smart port to a port-binding table. In an implementation, the port information of the port and the binding attribute of the port may be maintained through the port-binding table. Synchronizing the port information of the smart port and the binding attribute of the smart port to the port-binding table includes: synchronizing the port information of the smart port and the binding attribute of the smart port to a port-binding table of a southbound database of an open virtual network through a northbound database of the open virtual network. In an implementation, the neutron may send the information and binding attribute of the smart port of the deployed network to the port-binding table of the ovn-sb (the southbound database of the ovn) through the ovn-nb (the northbound database of the ovn) and the ovn-northd (a progress configured to synchronize the northbound database to the southbound database).

It should be noted that in the present embodiment, the smart monitor monitors changes of the port-binding table, that is, when the smart monitor monitors that the smart port is newly added in the port-binding table, the step of adding the second bare metal port into the network bridge of the bare metal server node, and binding the second bare metal port in the network bridge to the smart port is executed. In an implementation, the smart monitor (smart-monitor) is powered on to monitor, through def from_server, the port-binding table in the southbound database of the ovn. When the neutron creates the smart port of the deployed network and synchronizes data to the port-binding table in the southbound database of the ovn, the smart monitor may monitor this change. The pf0hpf is added into the br-int network bridge through a run function of PortBindingChassisEvent, and is bound to the smart port. When it is detected that the smart port has been bound by an ovn-controller, the ovn-controller may issue the flow table of the deployed network, and at this time, the configuration of the deployed network is completed.

As an implementation, before adding the second bare metal port into the network bridge of the bare metal server node, the method further includes: obtaining a hostname in a creating instruction of the smart port, and determining whether the hostname in the creating instruction is consistent with a hostname of the bare metal server node; and in a case that the hostname in the creating instruction is consistent with the hostname of the bare metal server node, executing the step of adding the second bare metal port into the network bridge of the bare metal server node. In an implementation, after the bare metal and the arm system of the smart network interface card are powered on, the smart monitor may obtain the corresponding hostname, that is, a hostname of the bare metal server node, and register the monitored port-binding table through a network. When the smart monitor monitors that the smart port of the deployed network has been created and carries a binding attribute, the smart monitor may execute a match_fn function of PortBindingChassisEvent to parse "requested-chassis", that is, the hostname in the creating instruction. In a case that the hostname in the creating instruction is not consistent with the hostname of the bare metal server node, the run function is executed to add the pf0hpf port to the br-int network bridge and bind the pf0hpf port to the smart port.

When the smart monitor monitors that the smart port in the port-binding table is deleted, the step of deleting the second bare metal port from the network bridge of the bare metal server node is executed. As an implementation, after the network deployment is completed, deleting the smart port includes: in a case that it is detected that a user mirror image is copied into a hard disk of the bare metal server node, determining that the network deployment is completed, and deleting the smart port. In an implementation, after the ironic copies the user mirror image to the hard disk of the bare metal, the ironic may invoke the neutron api to delete the smart port of the deployed network. After the deleted data information is synchronized to the ovn-sb, the smart monitor may monitor data deletion information and delete the pf0hpf from the br-int network bridge through the run function of PortBindingChassisEvent. At this time, the deployed network has been disconnected.

S103: in a case that the smart monitor monitors that a neutron port of a neutron network is updated, adding the second bare metal port into a network bridge of the bare metal server node, and binding the second bare metal port in the network bridge to the neutron port.

S104: issuing a flow table of the neutron network to perform switching from the deployed network of a bare metal service to the neutron network.

This step aims to achieve the switching from the deployed network to the neutron network, and the neutron network refers to a network specified when a user creates a cloud physical machine. As an implementation, after the neutron port of the neutron network is updated, the method further includes: synchronizing port information of the neutron port and a binding attribute of the neutron port to the port-binding table. Synchronizing the port information of the neutron port and the binding attribute of the neutron port to the port-binding table includes: synchronizing the port information of the neutron port and the binding attribute of the neutron port to the port-binding table of the southbound database of the open virtual network through the northbound database of the open virtual network. In an implementation, when the smart monitor monitors that the neutron port is newly added in the port-binding table, the step of adding the second bare metal port into the network bridge of the bare metal server node, and binding the second bare metal port in the network bridge to the neutron port is executed.

In an implementation, the Ironic may invoke the neutron api to update the neutron port of the neutron network. When updating information of the neutron port of the neutron network is transmitted to the ovn-sb, the smart monitor may monitor this change. The pf0hpf port is added to the br-int network bridge and is bound to the neutron port of the neutron network by using the run function of PortBindingChassisEvent. When it is detected by the ovn-controller that the neutron port of the neutron network has been bound, the ovn-controller may issue the flow table of the neutron network. At this time, the switching from the deployed network of the bare metal to the neutron network has been completed.

According to the embodiments of the present disclosure, the smart monitor monitors the port changes, and the smart port of the deployed network is used, so that configurations of the deployed network are achieved. In addition, in the embodiments of the present disclosure, by creating the neutron port of the neutron network, adding the second bare metal port into the network bridge of the bare metal server node, and binding the second bare metal port with the neutron port, the switching from the deployed network to the neutron network is achieved. Therefore, in the embodiments of the present disclosure, by controlling the adding and deletion of the second bare metal port on the smart network interface card into and from the network bridge of the bare metal server node, and controlling the issuing of the flow table of the deployed network and the flow table of the neutron network, thus the switching between the neutron network and the deployed network is controlled.

A network switching apparatus provided by the embodiments of the present disclosure may be described below. The network switching apparatus described below may refer to the network switching method described above.

Figure 3:
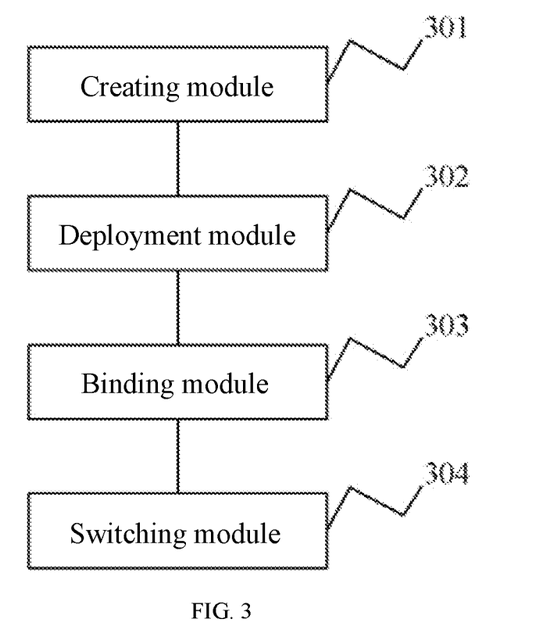
FIG. 3 is a structural diagram of a network switching apparatus shown according to an exemplary embodiment.

FIG. 3 is a structural diagram of a network switching apparatus shown according to an exemplary embodiment. As shown in FIG. 3, the network switching apparatus includes:

a creating module 301, configured to create a smart monitor configured to monitor port changes;

a deployment module 302, configured to: when the smart monitor monitors that a smart port of a deployed network is created, perform network deployment of a bare metal server node by using the smart port, wherein a smart network interface card is installed on the bare metal server node, and the smart network interface card generates a first bare metal port at the bare metal server node and generates a second bare metal port corresponding to the first bare metal port in an operating system of the smart network interface card;

a binding module 303, configured to: when the smart monitor monitors that a neutron port of a neutron network is updated, add the second bare metal port into a network bridge of the bare metal server node, and bind the second bare metal port in the network bridge to the neutron port; and a switching module 304, configured to issue a flow table of the neutron network, to perform switching from the deployed network of a bare metal service to the neutron network.

According to the embodiments of the present disclosure, the smart monitor monitors the port changes, and the smart port of the deployed network is used, so that configurations of the deployed network are achieved. In addition, in the embodiments of the present disclosure, by creating the neutron port of the neutron network, adding the second bare metal port into the network bridge of the bare metal server node, and binding the second bare metal port with the neutron port, the switching from the deployed network to the neutron network is achieved. Therefore, in the embodiments of the present disclosure, by controlling the adding and deletion of the second bare metal port on the smart network interface card into and from the network bridge of the bare metal server node, and controlling the issuing of the flow table of the deployed network and the flow table of the neutron network, thus the switching between the neutron network and the deployed network is controlled.

Based on the above embodiment, as an implementation, the deployment module 302 includes:

a binding unit, configured to add the second bare metal port into the network bridge of the bare metal server node, and bind the second bare metal port in the network bridge to the smart port;

a deployment unit, configured to issue a flow table of the deployed network to perform the network deployment of the bare metal service; and a deleting unit, configured to: after the network deployment is completed, delete the smart port, and delete the second bare metal port from the network bridge of the bare metal server node.

Based on the above embodiment, as an implementation, the deployment module 302 includes:

a first synchronizing unit, configured to synchronize port information of the smart port and a binding attribute of the smart port to a port-binding table; and correspondingly, the binding module 303 includes:

a second synchronizing unit, configured to synchronize port information of the neutron port and a binding attribute of the neutron port to a port-binding table.

Based on the above embodiment, as an implementation, the first synchronizing unit is a unit configured to synchronize the port information of the smart port and the binding attribute of the smart port to a port-binding table of a southbound database of an open virtual network through a northbound database of the open virtual network.

Correspondingly, the second synchronizing unit is a unit configured to synchronize the port information of the neutron port and the binding attribute of the neutron port to the port-binding table of the southbound database of the open virtual network through the northbound database of the open virtual network.

Based on the above embodiment, as an implementation, the smart monitor is configured to monitor changes of the port-binding table;

when the smart monitor monitors that the smart port is newly added to the port-binding table, a workflow of the binding unit is started;

when the smart monitor monitors that the smart port in the port-binding table is deleted, a workflow of the deleting unit is started; and when the smart monitor monitors that the neutron port is newly added to the port-binding table, a workflow of the binding module 303 is started.

Based on the above embodiment, as an implementation, the deployment module 302 further includes:

a determining unit, configured to: obtain a hostname in a creating instruction of the smart port, and determine whether the hostname in the creating instruction is consistent with a hostname of the bare metal server node; and in a case that the hostname in the creating instruction is consistent with the hostname of the bare metal server node, start the workflow of the binding unit.

Based on the above embodiment, as an implementation, the deleting unit is a unit configured to: in a case that it is detected that a user mirror image is copied into a hard disk of the bare metal server node, determine that the network deployment is completed, delete the smart port, and delete the second bare metal port from the network bridge of the bare metal server node.

Based on the above embodiment, as an implementation, the apparatus further includes:

an installing module, configured to deploy Openstack on a deployment node, and install a smart network interface card at the bare metal server node; and a configuration module, configured to configure internet protocol (IP) addresses for the deployment node and the bare metal server node, respectively, to achieve communication between the deployment node and the bare metal server node.

As for the apparatus in the above embodiment, a manner used by each module to execute operations has been described in detail in the embodiment of the method, and will not be elaborated here.

Figure 4:
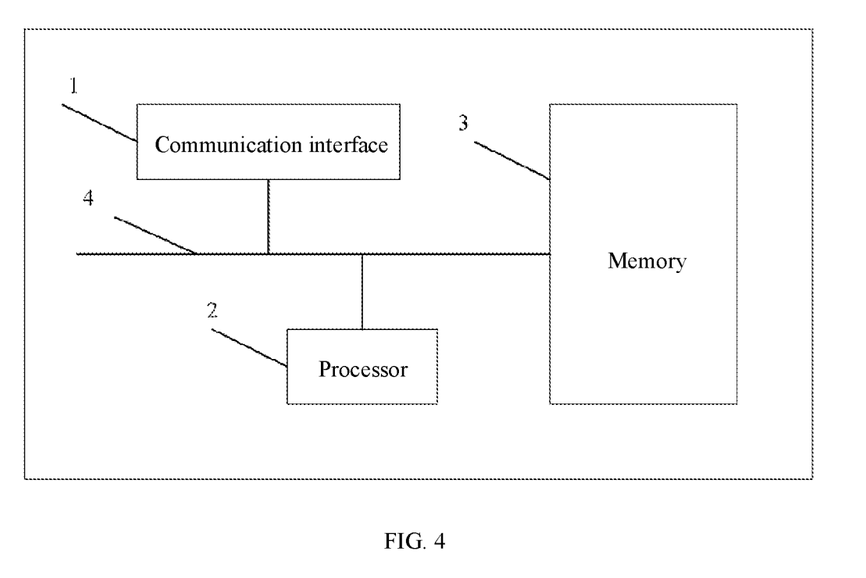
FIG. 4 is a structural diagram of an electronic device shown according to an exemplary embodiment.

Based on the hardware implementation of the above program modules, and in order to implement the method of the embodiments of the present disclosure, the embodiments of the present disclosure further provide an electronic device. FIG. 4 is a structural diagram of an electronic device according to an exemplary embodiment. As shown in FIG. 4, the electronic device includes:

a communication interface 1, configured to be able to exchange information with other devices such as a network device; and a processor 2, connected to the communication interface 1 to achieve the information exchange with other devices, and configured to run a computer program to perform the network switching method provided by one or more of the above technical solutions. The computer program is stored on a memory 3.

Of course, in practical applications, the various components in the electronic device are coupled together through a bus system 4. Understandably, the bus system 4 is configured to achieve connection and communication between these components. The bus system 4 includes not only the data bus, but also a power bus, a control bus, and a state signal bus. However, for clarity, the various buses in FIG. 4 are labeled as bus system 4.

The memory 3 in the present embodiment of the present disclosure is configured to store various types of data to support operations of the electronic device. Examples of the data include any computer program configured to be operated on the electronic device.

It may be understood that the memory 3 may be either a volatile or non-volatile memory, or may include both a volatile memory and a non-volatile memory. The non-volatile memory may be a read only memory (ROM), a programmable read only memory (PROM), an erasable programmable read only memory (EPROM), an electrically erasable programmable read only memory (EEPROM), a ferromagnetic random access memory (FRAM), a flash memory, a magnetic surface memory, a compact disc, or a compact disc read-only memory (CD-ROM). The magnetic surface memory may be a disk storage or a magnetic tape memory. The volatile memory may be a random access memory (RAM), which is used as an external cache. By way of illustration which is exemplary but not limited, RAMs in many forms are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a Direct rambus random access memory (DRRAM). The memory 3 described in the present embodiment of the present disclosure aims to include but not limited to these and any other suitable types of memories.

The method disclosed by the embodiments of the present disclosure may be applied to the processor 2, or implemented by the processor 2. The processor 2 may be an integrated circuit chip with a signal processing ability. In an implementation process, all the steps of the above method may be completed by an integrated logic circuit of hardware or instructions in the form of software in the processor 2. The foregoing processor 2 may be a general-purpose processor, a digital signal processor (DSP), another programmable logic device, discrete gate, transistor logic device, discrete hardware component, or the like. The processor 2 may implement or execute the methods, steps, and logical block diagrams disclosed in the embodiments of the present disclosure. The general-purpose processor may be a microprocessor or any conventional processor. The steps of the method disclosed in the embodiments of the present disclosure may be directly executed by a hardware decoding processor, or executed by a combination of hardware and software modules in a decoding processor. The software module may be located in a storage medium. The storage medium is located in the memory 3. The processor 2 reads a program in the memory 3 and completes the steps of the aforementioned method in combination with the hardware of the processor.

When executing the program, the processor 2 implements the corresponding processes in the respective methods of the embodiments of the present disclosure. For simplicity, this will be not repeated here.

In an exemplary embodiment, the embodiments of the present disclosure further provide a storage medium, namely, a computer storage medium, a computer-readable storage medium, such as the memory 3 for storing a computer program. The computer program may be executed by the processor 2 to complete the steps of the aforementioned method. The computer-readable storage medium may be a memory such as an FRAM, a ROM, a PROM, an EPROM, an EEPROM, a flash memory, a magnetic surface memory, a compact disc, or a CD-ROM.

Those of ordinary skill in the art may understand that: all or part of the steps of the foregoing method embodiments may be implemented by a program that instruct related hardware. The foregoing program may be stored in a computer-readable storage medium. When executed, the program executes the steps of the above method embodiments. The foregoing storage medium includes: various media that may store program codes, such as a mobile storage device, a ROM, a RAM, a magnetic disk, or a compact disc.

Or, the foregoing integrated modules of the present disclosure, if implemented in the form of software functional modules and sold or used as a standalone product, may be stored in a computer-readable storage medium. Based on such an understanding, the technical solutions of the embodiments of the present disclosure or parts that make contributions to the prior art may be embodied in the form of a software product, and the computer software product is stored in a storage medium, including a plurality of instructions configured to cause an electronic device (which may be a personal computer, a server or a network device) to execute all or part of the methods of the various embodiments of the present disclosure. The foregoing storage media include: various media that may store program codes, such as the mobile storage device, the ROM, the RAM, the magnetic disk or the compact disc.

The above is only the embodiments of the present disclosure, but the scope of protection of the present disclosure is not limited to this. Any technical personnel familiar with this technical field may easily think of changes or replacements within the technical scope disclosed in the present disclosure, which should be covered within the scope of protection of the present disclosure. Therefore, the scope of protection of the present disclosure shall be based on the scope of protection of the claim.

The invention claimed is:

1. A network switching method, comprising:
creating a smart monitor configured to monitor port changes in an operating system of a smart network interface card;
in a case that the smart monitor monitors that a smart port of a deployed network is created, performing network deployment of a bare metal server node by using the smart port, wherein the smart network interface card is installed on the bare metal server node, and the smart network interface card generates a first bare metal port at the bare metal server node and generates a second bare metal port corresponding to the first bare metal port in the operating system of the smart network interface card;

in a case that the smart monitor monitors that a neutron port of a neutron network is updated, adding the second bare metal port into a network bridge of the bare metal server node, and binding the second bare metal port in the network bridge to the neutron port, wherein the neutron port is located in a neutron; and issuing a flow table of the neutron network to an open virtual switch bare of the bare metal server node to perform switching from the deployed network of a bare metal service to the neutron network.

2. The network switching method according to claim 1, wherein performing the network deployment of the bare metal server node by using the smart port comprises:

adding the second bare metal port into the network bridge of the bare metal server node, and binding the second bare metal port in the network bridge to the smart port;

issuing a flow table of the deployed network to the open virtual switch bare of the bare metal server node to perform the network deployment of the bare metal service; and after the network deployment is completed, deleting the smart port, and deleting the second bare metal port from the network bridge of the bare metal server node.

3. The network switching method according to claim 2, wherein after the smart port of the deployed network is created, the method further comprises:

synchronizing port information of the smart port and a binding attribute of the smart port to a port-binding table; and after the neutron port of the neutron network is updated, the method further comprises:

synchronizing port information of the neutron port and a binding attribute of the neutron port to the port-binding table.

4. The network switching method according to claim 3, wherein synchronizing the port information of the smart port and the binding attribute of the smart port to the port-binding table comprises:

synchronizing the port information of the smart port and the binding attribute of the smart port to a port-binding table of a southbound database of an open virtual network through a northbound database of the open virtual network; and correspondingly, synchronizing the port information of the neutron port and the binding attribute of the neutron port to the port-binding table comprises:

synchronizing the port information of the neutron port and the binding attribute of the neutron port to the port-binding table of the southbound database of the open virtual network through the northbound database of the open virtual network.

5. The network switching method according to claim 3, wherein the smart monitor is configured to monitor changes of the port-binding table;

when the smart monitor monitors that the smart port is newly added in the port-binding table, the step of adding the second bare metal port into the network bridge of the bare metal server node, and binding the second bare metal port in the network bridge to the smart port is executed;

when the smart monitor monitors that the smart port in the port-binding table is deleted, the step of deleting the second bare metal port from the network bridge of the bare metal server node is executed; and when the smart monitor monitors that the neutron port is newly added in the port-binding table, the step of adding the second bare metal port into the network bridge of the bare metal server node, and binding the second bare metal port in the network bridge to the neutron port is executed.

6. The network switching method according to claim 2, wherein before adding the second bare metal port into the network bridge of the bare metal server node, the method further comprises:

obtaining a hostname in a creating instruction of the smart port, and determining whether the hostname in the creating instruction is consistent with a hostname of the bare metal server node; and in a case that the hostname in the creating instruction is consistent with the hostname of the bare metal server node, executing the step of adding the second bare metal port into the network bridge of the bare metal server node.

7. The network switching method according to claim 2, wherein after the network deployment is completed, deleting the smart port comprises:

in a case that it is detected that a user mirror image is copied into a hard disk of the bare metal server node, determining that the network deployment is completed, and deleting the smart port.

8. The network switching method according to claim 1, wherein before creating the smart monitor configured to monitor the port changes, the method further comprises:

deploying Openstack on a deployment node, and installing the smart network interface card at the bare metal server node; and configuring internet protocol (IP) addresses for the deployment node and the bare metal server node, respectively, to achieve communication between the deployment node and the bare metal server node.

9. An electronic device, comprising a communication interface and a bus system, wherein the electronic device further comprises:

a memory, configured to store a computer program; and a processor, configured to implement, when the processor executes the computer program, the steps of the network switching method according to claim 1;

wherein the communication interface, the memory and the processor are coupled together through the bus system.

10. The electronic device according to claim 9, wherein before creating the smart monitor configured to monitor the port changes, the method further comprises:

deploying Openstack on a deployment node, and installing the smart network interface card at the bare metal server node; and configuring internet protocol (IP) addresses for the deployment node and the bare metal server node, respectively, to achieve communication between the deployment node and the bare metal server node.

11. A non-transitory computer-readable storage medium, wherein the non-transitory computer-readable storage medium stores a computer program; and when the computer program is executed by a processor, the steps of the network switching method according to claim 1 are implemented.

12. The network switching method according to claim 1, wherein in the case that the smart monitor monitors that a smart port of a deployed network is created, performing network deployment of the bare metal server node by using the smart port, wherein the smart network interface card is installed on the bare metal server node, and the smart network interface card generates a first bare metal port at the bare metal server node and generates the second bare metal port corresponding to the first bare metal port in the operating system of the smart network interface card comprises:

by deploying the network, a bare metal obtaining a memory file system of a deployment mirror image.

13. The network switching method according to claim 12, wherein after the bare metal obtains the memory file system of the deployment mirror image, the method further comprises:

after the memory file system is powered on, copying a user mirror image to a bare metal system.

14. The network switching method according to claim 8, wherein the Openstack comprises a neutron ironic nova component.

15. The electronic device according to claim 9, wherein performing the network deployment of the bare metal server node by using the smart port comprises:

adding the second bare metal port into the network bridge of the bare metal server node, and binding the second bare metal port in the network bridge to the smart port;

issuing a flow table of the deployed network to the open virtual switch bare of the bare metal server node to perform the network deployment of the bare metal service; and after the network deployment is completed, deleting the smart port, and deleting the second bare metal port from the network bridge of the bare metal server node.

16. The electronic device according to claim 15, wherein after the smart port of the deployed network is created, the method further comprises:

synchronizing port information of the smart port and a binding attribute of the smart port to a port-binding table; and after the neutron port of the neutron network is updated, the method further comprises:

synchronizing port information of the neutron port and a binding attribute of the neutron port to the port-binding table.

17. The electronic device according to claim 16, wherein synchronizing the port information of the smart port and the binding attribute of the smart port to the port-binding table comprises:

synchronizing the port information of the smart port and the binding attribute of the smart port to a port-binding table of a southbound database of an open virtual network through a northbound database of the open virtual network; and correspondingly, synchronizing the port information of the neutron port and the binding attribute of the neutron port to the port-binding table comprises:

synchronizing the port information of the neutron port and the binding attribute of the neutron port to the port-binding table of the southbound database of the open virtual network through the northbound database of the open virtual network.

18. The electronic device according to claim 16, wherein the smart monitor is configured to monitor changes of the port-binding table;

when the smart monitor monitors that the smart port is newly added in the port-binding table, the step of adding the second bare metal port into the network bridge of the bare metal server node, and binding the second bare metal port in the network bridge to the smart port is executed;

when the smart monitor monitors that the smart port in the port-binding table is deleted, the step of deleting the second bare metal port from the network bridge of the bare metal server node is executed; and when the smart monitor monitors that the neutron port is newly added in the port-binding table, the step of adding the second bare metal port into the network bridge of the bare metal server node, and binding the second bare metal port in the network bridge to the neutron port is executed.

19. The electronic device according to claim 15, wherein before adding the second bare metal port into the network bridge of the bare metal server node, the method further comprises:

obtaining a hostname in a creating instruction of the smart port, and determining whether the hostname in the creating instruction is consistent with a hostname of the bare metal server node; and in a case that the hostname in the creating instruction is consistent with the hostname of the bare metal server node, executing the step of adding the second bare metal port into the network bridge of the bare metal server node.

20. The electronic device according to claim 15, wherein after the network deployment is completed, deleting the smart port comprises:

in a case that it is detected that a user mirror image is copied into a hard disk of the bare metal server node, determining that the network deployment is completed, and deleting the smart port.

\* \* \* \* \*